US012718552B2

(12) United States Patent
Kojima et al.

(10) Patent No.: US 12,718,552 B2
(45) Date of Patent: Aug. 25, 2026

(54) ABNORMALITY DETERMINATION DEVICE AND ABNORMALITY DETERMINATION METHOD FOR AN ADDITIVE MANUFACTURING APPARATUS

(71) Applicant: SINTOKOGIO, LTD., Nagoya (JP)

(72) Inventors: Kazuya Kojima, Nagoya (JP); Norihiro Asano, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 293 days.

(21) Appl. No.: 18/536,656

(22) Filed: Dec. 12, 2023

(65) Prior Publication Data

US 2024/0233364 A1 Jul. 11, 2024

(30) Foreign Application Priority Data

Jan. 10, 2023 (JP) ................................ 2023-001819

(51) Int. Cl.

| | |
|---|---|
| ***G06V 10/98*** | (2022.01) |
| ***B28B 17/00*** | (2006.01) |
| ***B29C 64/393*** | (2017.01) |
| *B33Y 50/02* | (2015.01) |

(52) U.S. Cl.

CPC ........ *G06V 10/993* (2022.01); *B28B 17/0072* (2013.01); *B29C 64/393* (2017.08); *B33Y 50/02* (2014.12)

(58) Field of Classification Search

None

See application file for complete search history.

(56) References Cited

U.S. PATENT DOCUMENTS

| | | | | |
|---|---|---|---|---|
| 8,269,960 B2 * | 9/2012 | Reich | .................... | H10P 74/203 700/110 |
| 2002/0114506 A1 * | 8/2002 | Hiroi | ................ | G01N 21/95684 382/149 |
| 2010/0141755 A1 * | 6/2010 | Iwanaga | ................ | G06T 7/001 348/94 |
| 2020/0307099 A1 * | 10/2020 | Daniels | .................. | B33Y 50/02 |

(Continued)

FOREIGN PATENT DOCUMENTS

JP 2020-163845 A 10/2020

*Primary Examiner* — Abderrahim Merouan
*Assistant Examiner* — Pawan Dhingra
(74) *Attorney, Agent, or Firm* — Faegre Drinker Biddle & Reath LLP

(57) ABSTRACT

An abnormality determination device for an additive manufacturing apparatus for building a part having three-dimensional shape by repeatedly forming a membrane of raw material and forming a cured layer having two-dimensional shape, the membrane formed by a blade in a build area, the raw material including ceramic particles and photocurable resin, the cured layer formed by irradiating the membrane with light in the build area, the abnormality determination device includes a controller configured to perform abnormality determination based on an image captured by an image sensor, the controller is configured to acquire the image of the membrane captured by the image sensor, detect a linear abnormal portion appearing in the membrane as a line extending along a movement direction of the blade based on the acquired image of the membrane, and determine that layering fault has occurred in response to detection of the linear abnormal portion.

7 Claims, 5 Drawing Sheets

(56) References Cited

U.S. PATENT DOCUMENTS

| | | | | |
|---|---|---|---|---|
| 2020/0378899 | A1* | 12/2020 | Cho | G01N 21/455 |
| 2021/0018473 | A1* | 1/2021 | Takemoto | G01S 15/526 |
| 2023/0078772 | A1* | 3/2023 | Cloots | B33Y 50/00<br>264/40.1 |

* cited by examiner

START
PREPARE ONE LAYER OF RAW MATERIAL 50
S10
FORM FILM 33 OF RAW MATERIAL BY THE BLADE 42
S12
IMAGE THE FILM 33 BY THE IMAGE SENSOR 60
S14
IS THERE A LINEAR ABNORMAL PORTION?
S16
YES
NO
PROCESSING AT THE TIME OF ABNORMALITY
S18
FORM CURED LAYER BY THE LAYER FORMING UNIT 2
S20
LOWER THE BASE 31 BY ONE LAYER
S22
IS END CONDITION SATISFIED?
S24
NO
YES
END

ABNORMALITY DETERMINATION DEVICE AND ABNORMALITY DETERMINATION METHOD FOR AN ADDITIVE MANUFACTURING APPARATUS

CROSS-REFERENCE TO RELATED APPLICATIONS

This application claims the benefit of priority from Japanese Patent Application No. 2023-001819, filed on Jan. 10, 2023, the entire contents of which are incorporated herein by reference.

TECHNICAL FIELD

The present disclosure relates to an abnormality determination device and an abnormality determination method.

BACKGROUND

Japanese Patent Application Publication No. 2020-163845 discloses an additive manufacturing apparatus for building a part (article) having three-dimensional shape. The apparatus prints layers based on a three-dimensional model. The apparatus images the printed layer, compares the imaged image to a prescribed pattern, and takes corrective action when there is a discrepancy.

SUMMARY

Meanwhile, as the additive manufacturing apparatus, an apparatus employing a technique of building a part having three-dimensional shape by repeatedly forming a membrane of raw material including photocurable resin in a build area with a blade and forming a cured layer having two-dimensional shape by irradiating the membrane with light in the build area is known.

In the apparatus employing the technique, when abnormality determination based on image described in Japanese Patent Application Publication No. 2020-163845 is employed, it is possible to determine formation fault of the cured layer of two-dimensional shape, however, it is difficult to determine layering fault of the cured layer of two-dimensional shape. The present disclosure provides a technique for determining layering fault in the cured layer of two-dimensional shape.

BRIEF DESCRIPTION OF THE DRAWINGS

An abnormality determination device according to an aspect of the present disclosure is used for an additive manufacturing apparatus. The additive manufacturing apparatus builds a part having three-dimensional shape by repeatedly forming a membrane of raw material and forming a cured layer having two-dimensional shape. The membrane is formed by a blade in a build area. The raw material includes ceramic particles and photocurable resin. The cured layer is formed by irradiating the membrane with light in the build area. The abnormality determination device includes a controller configured to perform abnormality determination based on an image captured by an image sensor. The controller is configured to acquire the image of the membrane captured by the image sensor, detect a linear abnormal portion appearing in the membrane as a line extending along a movement direction of the blade based on the acquired image of the membrane, and determine that layering fault has occurred in response to detection of the linear abnormal portion.

BRIEF DESCRIPTION OF THE DRAWINGS

According to the present disclosure, it is possible to determine layering fault of the cured layer having two-dimensional shape.

BRIEF DESCRIPTION OF THE DRAWINGS

Figure 1:
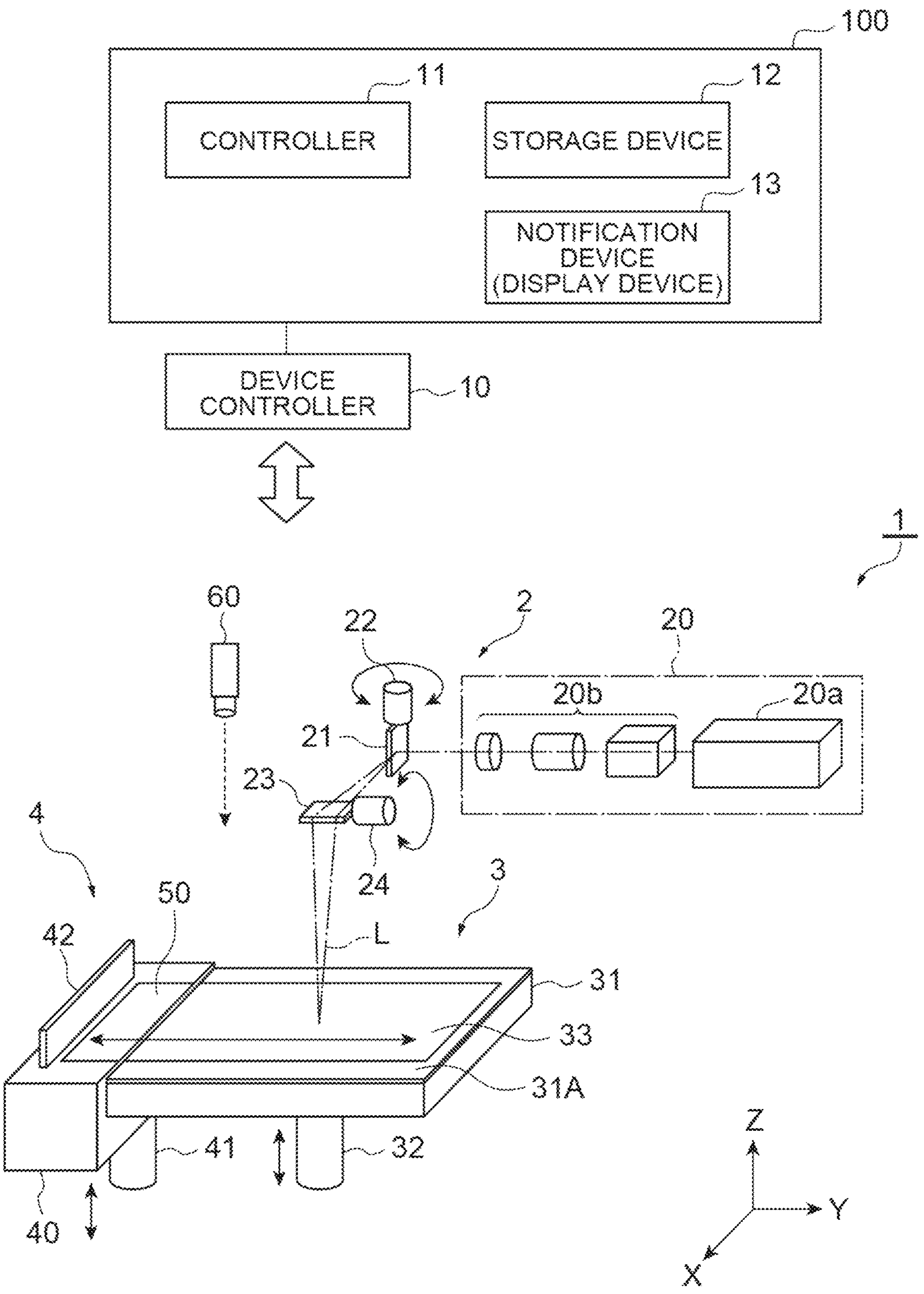

FIG. 1 is a schematic diagram of an additive manufacturing apparatus in which an abnormality determination device according to an embodiment is used.

Figure 2A:
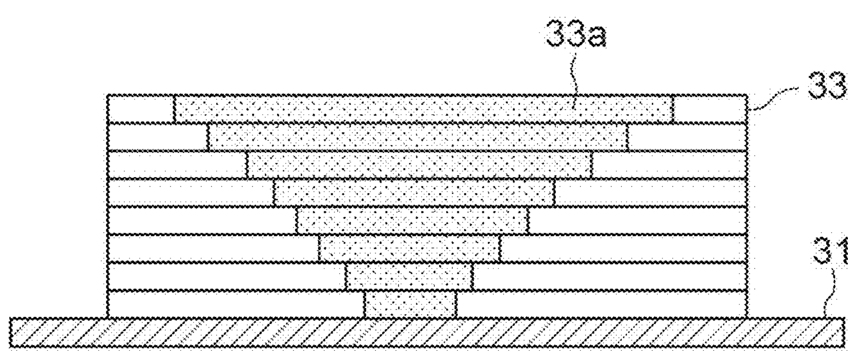
Figure 2B:
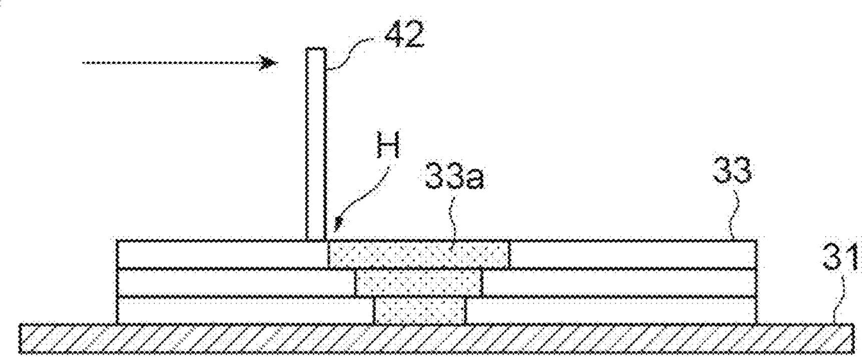
Figure 2C:
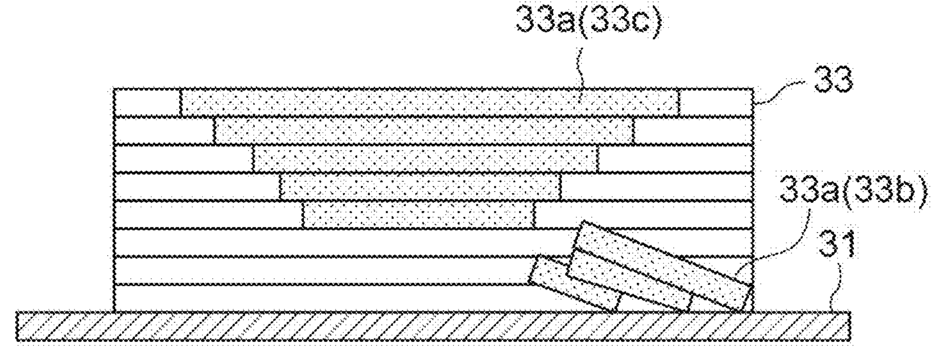

FIGS. 2A, 2B, and 2C are schematic views for explaining a process in which layering fault occurs.

Figure 3A:
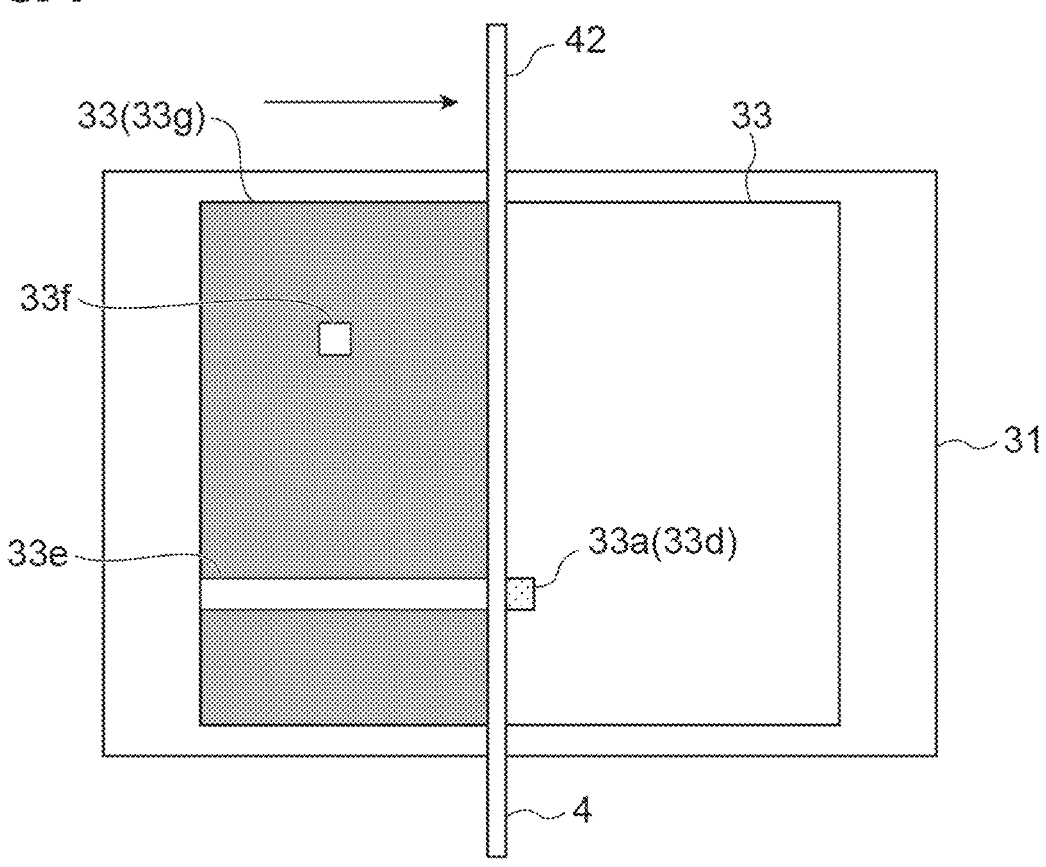
Figure 3B:
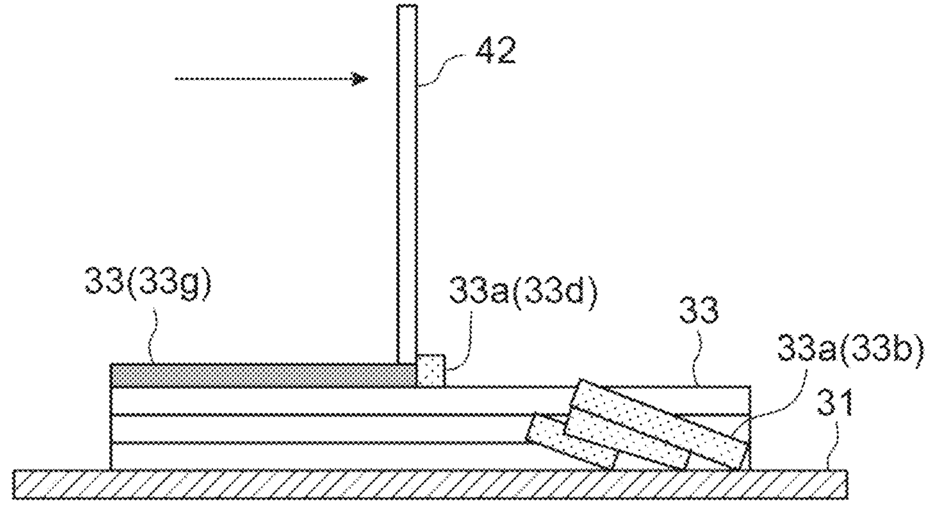

FIGS. 3A and 3B are schematic diagrams illustrating streaks occurring in a membrane of raw material.

Figure 4:
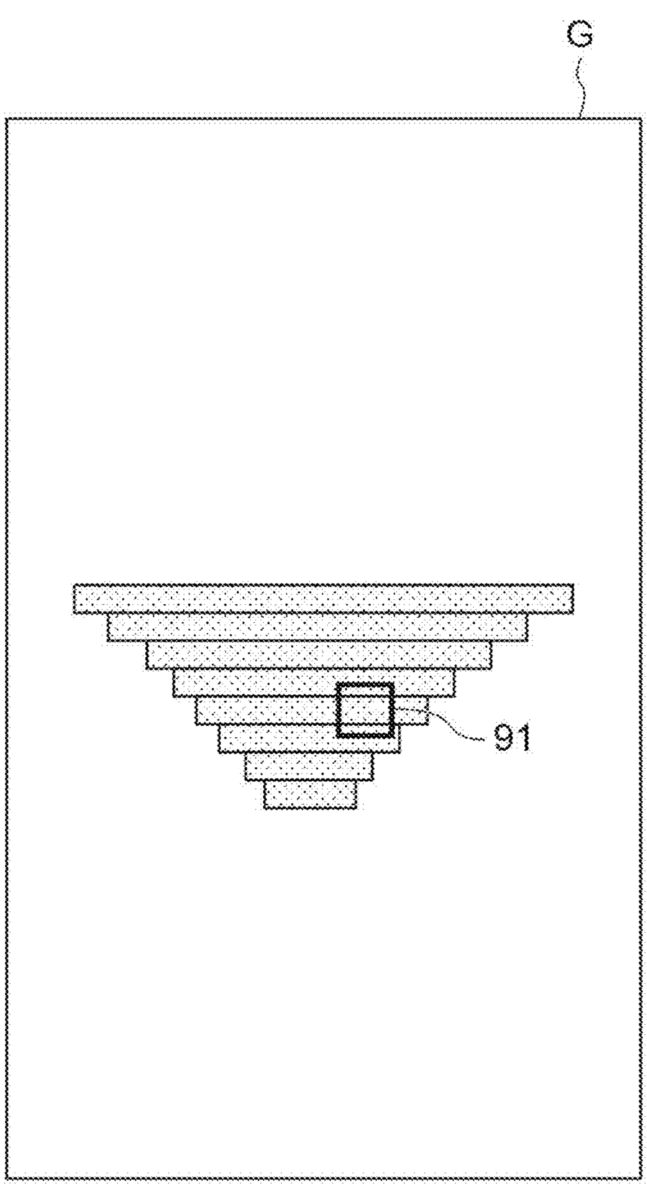

FIG. 4 is a presentation example of a linear abnormal portion.

Figure 5:
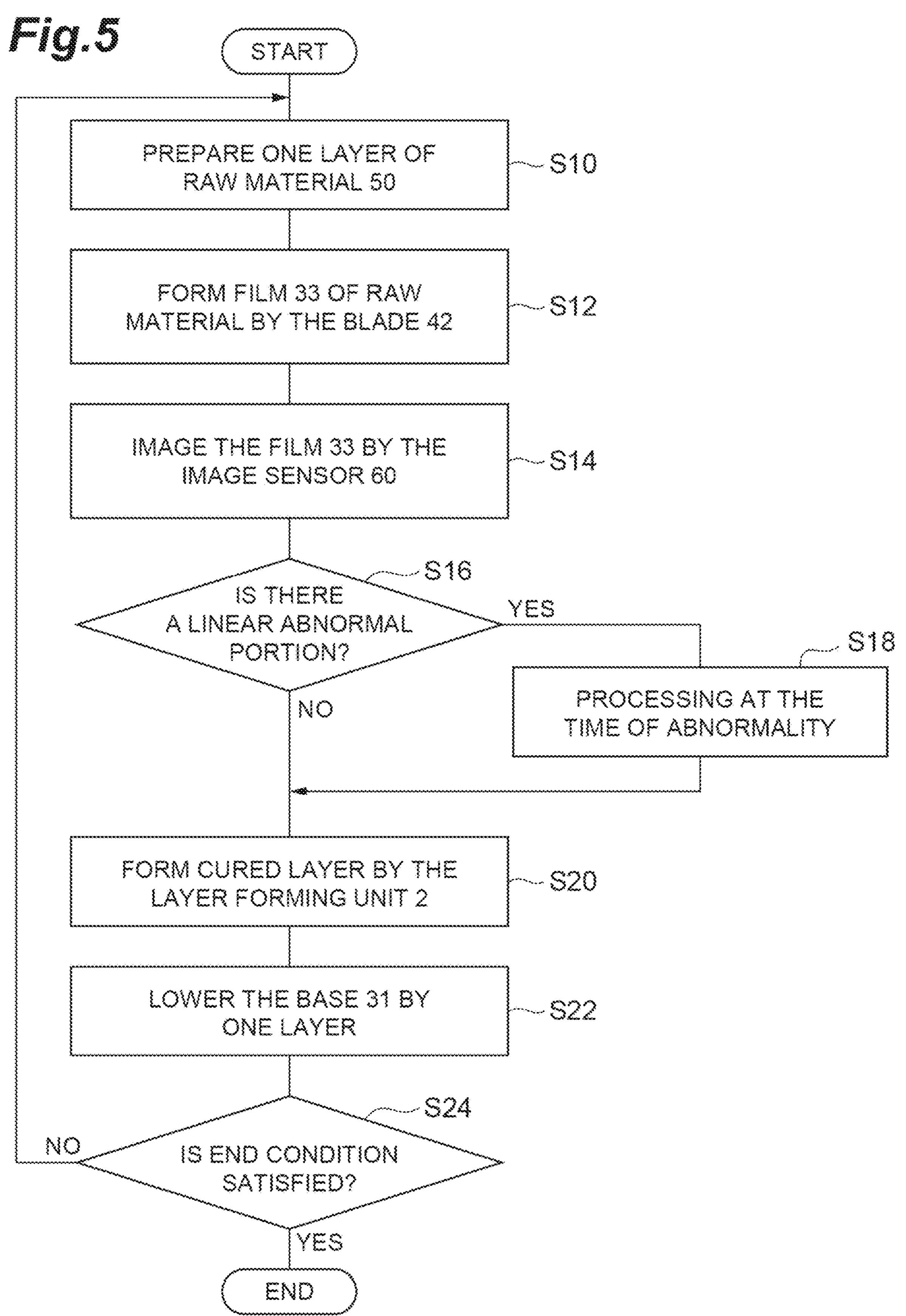

FIG. 5 is a flowchart illustrating an example of an abnormality determination method.

DETAILED DESCRIPTION

Summary of Embodiments of the Present Disclosure

First, an outline of an embodiment of the present disclosure will be described.

(Clause 1) An abnormality determination device according to an aspect of the present disclosure is used for an additive manufacturing apparatus. The additive manufacturing apparatus builds a part having three-dimensional shape by repeatedly forming a membrane of raw material and forming a cured layer having two-dimensional shape. The membrane is formed by a blade in a build area. The raw material includes ceramic particles and photocurable resin. The cured layer is formed by irradiating the membrane with light in the build area. The abnormality determination device includes a controller configured to perform abnormality determination based on an image captured by an image sensor. The controller is configured to acquire the image of the membrane captured by the image sensor, detect a linear abnormal portion appearing in the membrane as a line extending along a movement direction of the blade based on the acquired image of the membrane, and determine that layering fault has occurred in response to detection of the linear abnormal portion.

In the abnormality determination device according to clause 1, the image of the membrane captured by the image sensor is acquired, and the linear abnormal portion extending along the movement direction of the blade generated in the membrane is detected based on the acquired image of the membrane. The linear abnormal portion appearing on the membrane as a line extending along the movement direction of the blade is formed by the blade hooking and dragging the cured layer or a portion of the cured layer having two-dimensional shape.

When the blade drags the cured layer having two-dimensional shape or a part of the cured layer, since the position of the cured layer having the two-dimensional shape deviates from the design value, the subsequently formed cured layer cannot be connected to the dragged cured layer, and layering fault occurs. The abnormality determination device according to clause 1 can determine layering fault of the cured layer having two-dimensional shape by detecting the linear abnormal portion that appears on the membrane as a line extending along the movement direction of the blade.

(Clause 2) The abnormality determination device according to clause 1 may further include a notification device configured to notify the operator, and the controller may cause the notification device to notify that the layering fault has occurred. The abnormality determination device according to clause 2 can notify the operator of the occurrence of the layering fault by the notification device.

(Clause 3) The abnormality determination device according to clause 1 or 2 may further include a storage device. The controller may be configured to store the image captured by the image sensor in the storage device in response to determining that the layering fault has occurred, detect a position and a size of the linear abnormal portion based on the acquired image of the membrane, and store the detected position and size of the linear abnormal portion in the storage device. The abnormality determination device according to clause 3 can collect data for verifying later an image in which layering fault is determined to have occurred.

(Clause 4) In the abnormality determination device according to any one of clauses 1 to 3, the controller may be configured to detect a position and a size of the linear abnormal portion based on the acquired image of the membrane, obtain data of the part including data of cross-sectional shape for each layer, and cause a display device to display an appearance of the part on which the linear abnormal portion is marked based on the acquired data and the detected position and size of the linear abnormal portion. The abnormality determination device according to clause 4 may cause the display device to display the linear abnormal portion in a visible manner.

(Clause 5) The abnormality determination device according to clause 1 or 2 may further include a storage device, wherein the controller may be configured to detect a point-like abnormal portion appearing at a point occurring in the membrane, and detecting a position and a size of the linear abnormal portion and the point-like abnormal portion based on the acquired image of the membrane, and store the detected position and size of the linear abnormal portion and the point-like abnormal portion in the storage device. The linear abnormal portion and the point-like abnormal portion may be classified based on the size and the movement direction. Since the linear abnormal portion and the point-like abnormal portion are distinguishably stored, the abnormality determination device according to clause 5 can collect, for example, a detection threshold value of the linear abnormal portion or data for verifying a setting value of the part or the support.

(Clause 6) In the abnormality determination device according to clause 5, the storage device may further store data of an appearance inspection result after the part is built and data of whether the layering fault occurs. The abnormality determination device according to clause 6 may collect an appearance inspection result in which it is determined that layering fault has occurred, in order to verify the appearance inspection result later.

(Clause 7) An abnormality determination method according to another aspect of the present disclosure is applied to an additive manufacturing apparatus. The additive manufacturing apparatus builds a part having three-dimensional shape by repeatedly forming a membrane of raw material and forming a cured layer having two-dimensional shape. The membrane is formed by a blade in a build area. The raw material includes ceramic particles and photocurable resin. The cured layer is formed by irradiating the membrane with light in the build area. The abnormality determination method includes acquiring an image of the membrane captured by an image sensor, detecting a linear abnormal portion appearing in the membrane as a line extending along a movement direction of the blade based on the acquired image of the membrane, and determining that layering fault has occurred in response to detecting the linear abnormal portion.

The abnormality determination method according to clause 7 has the same effect as the abnormality determination device according to clause 1.

Examples of Embodiments of the Present Disclosure

Embodiments of the present disclosure will be described in detail with reference to the drawings. In the description of the drawings, the same elements are denoted by the same reference numerals, and redundant description is omitted. The dimensional ratios in the drawings are not necessarily consistent with those in the description. The terms “up”, “down”, “left” and “right” are based on the illustrated state and are for convenience.

[Example of Additive Manufacturing Apparatus]

FIG. 1 is a schematic diagram of an additive manufacturing apparatus in which an abnormality determination device according to an embodiment is used. X direction (first direction) and Y direction (second direction) in the drawing are horizontal directions, and Z direction is a vertical direction. Hereinafter, the Z direction is also referred to as an up-down direction.

A additive manufacturing apparatus 1 builds a part having three-dimensional shape. The additive manufacturing apparatus 1 builds the part, for example based on three-dimensional CAD data. The three-dimensional CAD data includes data having cross-sectional shape for each layer. The additive manufacturing apparatus 1 forms the cross-section of the part layer by layer based on the data of cross-sectional shape.

The additive manufacturing apparatus 1 builds the part, for example by Vat photopolymerization method. The additive manufacturing apparatus 1 forms a layer by irradiating raw material including a photocurable resin and ceramic particles with light. The raw material is the part of material. The raw material is mixture including photocurable resin and ceramic particles. The mixture is slurry. The raw material may be a powder. As an example, the additive manufacturing apparatus 1 may build the part by Vat photopolymerization method that does not use a bathtub storing a liquid raw material.

The photocurable resin is a synthetic organic material that absorbs light and changes into solid. The photocurable resin is, for example, an ultraviolet curable resin, and is cured when irradiated with ultraviolet light. The raw material may include metals and other resins in addition to the photocurable resin and the ceramic particles.

The ceramic particles may be particles made of fine ceramics adopted as a mechanical material, an electrical material, and a thermal material as an example. The fine ceramics may be formed of alumina, zirconia, silicon carbide, aluminum nitride, or the like.

As shown in FIG. 1, the additive manufacturing apparatus 1 includes a layer forming unit 2, a stage mechanism 3, a raw material supply unit 4, an image sensor 60, and a device controller 10. The layer forming unit 2, by way of example, includes an optical unit 20, light reflecting members 21, 23 and rotation drive units 22, 24. The optical unit 20 includes, for example, a light source 20*a* and an optical member 20*b* and emits light. An example of a light is an ultraviolet laser L. Hereinafter, an example of building using the ultraviolet laser L will be described, however, light is not limited to the ultraviolet laser L.

The light reflecting members 21, 23 are, for example, galvano mirror, and changes a light path of the ultraviolet laser L emitted from the optical unit 20. The light reflecting members 21, 23 are rotated about predetermined rotational axis by the rotation drive units 22, 24. By controlling the rotations of the light reflecting members 21, 23, the layer forming unit 2 can be irradiated with the ultraviolet laser L at a predetermined position in the horizontal direction at the layer formation height position.

The layer formation height position is a height predetermined as a height position at which the ultraviolet laser L is irradiated. When the ultraviolet laser L is irradiated, the ultraviolet curable resin included in the raw material is cured, and thus only a portion irradiated with the ultraviolet laser L is formed as a layer. The layer forming unit 2 is irradiated with the ultraviolet laser L so as to reproduce a cross-sectional shape based on the CAD data, thereby forming one layer of the cross-section of the part.

The stage mechanism 3 has a base 31. The base 31 moves up and down relative to the layer forming unit 2. As an example, the stage mechanism 3 includes a drive unit 32. The drive unit 32 is connected to the base 31 and moves the base 31 up and down. The drive unit 32 is, for example, an electric cylinder. As an example, the drive unit 32 lowers the base 31 by a height of one layer. The upper surface of the base 31 acts as a build area 31A and the part is built in the build area 31A.

The raw material supply unit 4 supplies raw material on the base 31 of the stage mechanism 3. The raw material supply unit 4 includes a raw material tank 40, a raw material preparation unit 41, and a blade 42. The raw material tank 40 stores the raw material therein. The raw material preparation unit 41 drives the bottom of the raw material tank 40 upward to supply raw material 50 for one layer to the opening formed in the top surface of the raw material tank 40. The raw material preparation unit 41 is, for example, an electric cylinder. The blade 42 is a plate-shaped member, and is configured to be movable in one axial direction (Y-axis direction). By moving from the raw material tank 40 to the base 31, the blade 42 supplies the raw material 50 for one layer on the raw material tank 40 onto the base 31 and forms a membrane on a membrane 33 of the raw material.

The additive manufacturing apparatus 1 includes the image sensor 60 for imaging the build area 31A. The image sensor 60 may be positioned to capture the plane of the build area 31A or may be positioned to look down at the build area 31A obliquely from above. A plurality of the image sensor 60 may be provided, or one ceiling may be provided. The image sensor 60 images the membrane 33 of the raw material in response to movement of the blade 42. For example, based on the control signal of the device controller 10, the image sensor 60 captures an image of the membrane 33 every time the raw material of the membrane 33 is formed into a membrane by the build area 31A.

The device controller 10 is hardware that controls the entire the additive manufacturing apparatus 1. The device controller 10 is configured by a general-purpose computer including, for example, an arithmetic device such as a central processing unit (CPU), a storage device such as a read only memory (ROM), a random-access memory (RAM), and a hard disk drive (HDD), and a communication device.

The device controller 10 is communicatively connected to the layer forming unit 2, the stage mechanism 3, the raw material supply unit 4, and the image sensor 60. The device controller 10 outputs control signals to the layer forming unit 2, the stage mechanism 3, the raw material supply unit 4, and the image sensor 60 to control the layer forming unit 2, the stage mechanism 3, the raw material supply unit 4, and the image sensor 60. The device controller 10 is connected to an operation panel (not shown) such as a touch panel, and operates the layer forming unit 2, the stage mechanism 3, the raw material supply unit 4, and the image sensor 60 in accordance with a command operation of an operator received by the operation panel. The device controller 10 may operate the layer forming unit 2, the stage mechanism 3, the raw material supply unit 4, and the image sensor 60 based on a three-dimensional CAD data stored in a storage device of the device controller 10.

The device controller 10 is communicatively coupled to an abnormality determination device 100. The abnormality determination device 100 is a device that determines an abnormality in the building process based on information acquired from the device controller 10. The abnormality determination device 100 includes a controller 11, a storage device 12, and a notification device 13. The controller 11 is constituted by a general-purpose computer including, for example, an arithmetic device such as a CPU, a storage device such as a ROM, a RAM, and an HDD, and a communication device.

The controller 11 performs abnormality determination based on an image captured by the image sensor 60. The abnormality determination is processing for determining that a case where cured layers of two-dimensional shape are not appropriately stacked is layering fault. Details of the abnormality determination will be described later.

The controller 11 may be connected to the storage device 12 and the notification device 13. The storage device 12 is a storage device such as an HDD, and the notification device 13 is a display device such as a display and/or a sound output device such as a speaker. The controller 11 stores information such as an image acquired from the device controller 10, a determination result based on the acquired information, and the like in the storage device 12. The controller 11 controls the notification device 13 to notify information to an operator or the like. Note that the controller 11 of the abnormality determination device 100 may be configured by the same hardware as the device controller 10. That is, one controller may perform both functions of the device controller 10 and the controller 11.

[Additive Manufacturing Method]

The formation of the part by the additive manufacturing apparatus 1 will now be outlined. The device controller 10 causes the additive manufacturing apparatus 1 to form the part on the base 31. The part is formed on the base 31 by moving the base 31 up and down relative to the layer forming unit 2 of the additive manufacturing apparatus 1. First, the device controller 10 causes the raw material supply unit 4 to feed raw material for one layer onto the base 31. The blade 42 forms the membrane 33 of the raw material into the base 31 and membranes.

Subsequently, the device controller 10 irradiates the layer forming unit 2 with the ultraviolet laser L. The layer forming unit 2 illuminates the ultraviolet laser L based on the CAD data for the membrane 33 of the raw material. The ultraviolet curable resin included in the raw material irradiated with the ultraviolet laser L is cured. This forms a cured layer of the part.

Subsequently, the device controller 10 adjusts the height of the base 31 to the drive unit 32. The drive unit 32 adjusts the height of the base 31 so that the upper surface of the base 31 is at the layer-forming height position. In particular, the drive unit 32 lowers the base 31 by height of one layer.

Subsequently, the device controller 10 causes the raw material supply unit 4 to feed raw material for one layer onto the base 31. The blade 42 forms the membrane 33 of the raw material into the base 31 and membranes. As a result, the already formed cured layer is buried in the membrane 33 of the raw material. The layer forming unit 2 irradiates the membrane 33 of the raw material with ultraviolet light based on the CAD data. The raw material irradiated with ultraviolet light is cured. The device controller 10 repeats such cured layer formation to form layers and build up layer by layer. Thus, the part is laminated. The part is conveyed to a baking apparatus (not shown) and baked. In this manner, a part is built.

[Layering Fault]

FIGS. 2A, 2B and 2C are schematic views for explaining a process in which layering fault occurs. As shown in FIG. 2A, in the case where no layering fault occurs, the membrane 33 and a cured layer 33*a* in which the membrane 33 is cured are stacked. The cured layer 33*a* in a respective films 33 is integrally connected.

Here, as shown in FIG. 2B, when the blade 42 forms a membrane in the next the membrane 33, for example, due to stress at the time of forming the membrane or interference with the part, the blade 42 may hit the lower the cured layer 33*a* (see H in the figure). When the blade 42 hits the cured layer 33*a*, the cured layer 33*a* may break or the part may fall over.

As shown in FIG. 2C, when the cured layer 33*a* is broken or the part falls down, a cured layer 33*c* formed next time and thereafter is not connected to the lower a cured layer 33*b*, and thus the layering fault occurs. Due to the broken link between the lower the cured layer 33*b* and the cured layer 33*c* formed after the next time, all the cured layer 33*c* formed after the next time become defective.

When the cured layer 33*a* breaks or the part falls over, a linear abnormal portion extending along the movement direction of the blade 42 is formed in the membrane 33 of the raw material. The linear abnormal portion is a streak (groove). FIGS. 3A and 3B are schematic diagrams illustrating streaks occurring in a membrane of raw material.

FIG. 3A is a plan view of the build area 31A, and FIG. 3B is a side view of FIG. 3A, in which only the base and the part are shown in cross-section. In FIGS. 3A and 3B, of the membrane 33 of the raw material, the membrane 33 (33*g*) that is currently being created is shown in grey. As shown in FIGS. 3A and 3B, when the blade 42 moves due to the formation membrane, when a debris 33*d* of the cured layer 33*b* is present, the blade 42 will cause the debris 33*d*. In this case, a streak 33*e* (an example of a linear abnormal portion) along the movement direction of the blade 42 is formed. A similar the streak 33*e* is formed when the blade 42 drags the inverted part itself.

The controller 11 of the abnormality determination device 100 recognizes the above-described the streak 33*e* with an image and determines layering fault. The controller 11 acquires from the device controller 10 an image of the membrane 33 imaged by the image sensor 60. The device controller 10 may operate the image sensor 60 to acquire an image immediately after the formation membrane of the membrane 33 by the blade 42.

Then, based on the acquired image of the membrane 33, the controller 11 detects the streak 33*e* occurring in the membrane 33 and extending along the movement direction of the blade 42. The controller 11 detects the position and size of the streak 33*e* based on, for example, a pattern matching technique, a feature amount detection technique, or the like. The controller 11 may detect the streak 33*e* by image recognition based on learned the streak 33*e* features (groove extending in movement direction, groove width constant). The controller 11 may be determined to be a linear abnormal portion when the groove extending in the movement direction of the blade 42 is greater than or equal to a predetermined value. The predetermined value is 5 cm as an example. The controller 11 determines that layering fault has occurred in response to detection of the streak 33*e*.

In response to determining that layering fault has occurred, the controller 11 may store an image captured by the image sensor 60 in the storage device 12. By storing the image in the storage device 12, data for subsequently verifying the image in which the layering fault has occurred is collected.

The controller 11 may detect the position (coordinate position) and size of the streak 33*e* of the membrane 33 and store them in the storage device 12. By storing the information of the streak 33*e* of the membrane 33 in the storage device 12, data for subsequently verifying the image of the membrane 33 determined to have caused the layering fault is collected.

The controller 11 may notify the operator of the occurrence of the layering fault by the notification device 13. By the notification from the notification device 13, it is possible to notify the operator that the layering fault has occurred. The loss of material and time is reduced because the operator can decide to stop making before the part is completed.

The controller 11 may display the appearance of the part marked with the linear abnormal portion of the membrane 33 on the display device which is the notification device 13. FIG. 4 is a presentation example of a linear abnormal portion. FIG. 4 shows a screen G of a display device. The controller 11 acquires a CAD data of the part including data having cross-sectional shape for each layer, and displays the part 90 on the screen G based on the CAD data. The controller 11 detects the position and size of the streak 33*e* based on the acquired image of the membrane 33.

The controller 11 marks a location corresponding to the streak 33*e* based on the position and size of the detected the streak 33*e*. As shown in FIG. 4, in the screen G, location corresponding to the streak 33*e* is marked by a square a mark 91. The marking technique is not limited to a square the mark 91. The mark 91 may be the shape of square other than, and the mark 91 may be highlighted in an optional color. Depending on the mark 91, the abnormality determination device 100 may cause the linear abnormal portion to be displayed on the display device in a visible manner.

[Abnormality Determination Method]

FIG. 5 is a flowchart illustrating an example of an abnormality determination method. The flowchart shown in FIG. 5 is executed by the device controller 10, the abnormality determination device 100 and the controller 11.

The device controller 10 operates the raw material supply unit 4 to prepare the raw material 50 for one layer (step S10). The raw material preparation unit 41 of the raw material supply unit 4 drives the bottom of the raw material tank 40 upward to provide the raw material 50 for one layer to the opening formed in the top surface of the raw material tank 40.

Next, the device controller 10 operates the raw material supply unit 4 to membrane the raw material the membrane 33 (step S12). The blade 42 of the raw material supply unit 4 supplies the raw material 50 for one layer onto the base 31 and forms a membrane for the membrane 33 of the raw material.

Next, the device controller 10 operates the image sensor 60 to image the membrane 33 (step S14). The image sensor 60 outputs an image in which the membrane 33 is included in the angle of view.

Next, the abnormality determination device 100 in the controller 11 acquires the image obtained in step S14, performs image recognition, and determines the presence or absence of a linear abnormal portion. The controller 11 determines that there is a linear abnormal portion when the streak 33*e* is formed in the membrane 33 (step S16: YES).

When it is determined that there is a linear abnormal portion (step S16: YES), the controller 11 executes an abnormality process that is performed when layering fault has occurred (step S18). The abnormality processing includes notification to an operator, recording of an image that is a basis for determining that layering fault has occurred, recording of all images obtained in step S14 when creating a part, stopping of the flowchart illustrated in FIG. 5, and the like, and is appropriately selected according to the situation.

When it is determined that there is no linear abnormal portion (step S16: NO), and when the flowchart illustrated in FIG. 5 is not stopped in step S18, the device controller 10 operates the layer forming unit 2 to irradiate the ultraviolet laser L and form the cured layer 33*a* in the membrane 33 (step S20).

Subsequently, the device controller 10 operates the drive unit 32 of the stage mechanism 3 to lower the base 31 of the stage mechanism 3 by one layer (step S22).

Subsequently, the device controller 10 determines whether an end condition is satisfied (step S24). The end condition is satisfied, for example, when the base 31 has descended to the lowest position and there is no room to descend. Alternatively, the end condition is satisfied when the set number of stacked layers is processed. Alternatively, the termination condition is satisfied when the device controller 10 receives a termination instruction from the operator.

When the end condition is not satisfied (step S24: NO), the device controller 10 starts processing from step S10. The device controller 10 and the controller 11 of the abnormality determination device 100 repeatedly execute step S10 to step S24 until the end condition is satisfied. When the end condition is satisfied (step S24: YES), the flowchart illustrated in FIG. 5 ends.

By executing the flowchart shown in FIG. 5, it is determined for each layer whether or not layering fault has occurred, and when layering fault has occurred, an abnormal-time process is executed.

Summary of Embodiment

In the abnormality determination device 100, an image of the membrane 33 captured by the image sensor 60 is acquired, and the streak 33*e* extending along the movement direction of the blade 42 occurring in the membrane 33 is detected based on the acquired image of the membrane 33. The streak 33*e* is formed by the blade 42 hooking and dragging a portion of two-dimensional shape the cured layer 33*a* or the cured layer 33*a*.

When the blade 42 drags a part of the cured layer 33*a* or the cured layer 33*a* of the two-dimensional shape, the position of the cured layer 33*a* of the two-dimensional shape deviates from the design value. Therefore, the cured layer 33*a* (the cured layer 33*c* in FIG. 2C) formed thereafter cannot be connected to the dragged the cured layer 33*a* (the cured layer 33*b* in FIG. 2C), and layering fault occurs. The abnormality determination device 100 can determine the layering fault of the cured layer 33*a* of the two-dimensional shape by detecting the streak 33*e* extending along the movement direction of the blade 42 occurring in the membrane 33. In the additive manufacturing apparatus 1, part is built in a state of being buried in raw material. Therefore, it is difficult for an operator to visually confirm the occurrence of link breakage between layers during the production of a part, and it is necessary to take out the part from the raw material after completion of shaping and confirm the presence or absence of a defect. In contrast, the abnormality determination device 100 can determine that layering fault has occurred during the creation of the part. This reduces material and time losses.

While various exemplary embodiments have been described above, various omissions, substitutions, and changes may be made without being limited to the exemplary embodiments described above.

For example, the abnormality determination device 100 may detect an abnormal location of the streak 33*e* other than. For example, the abnormality determination device 100 may detect a wound 33*f* (an example of a point-like abnormal portion) of the membrane 33 based on the image of the image sensor 60 as illustrated in FIG. 3A. The membrane 33's the wound 33*f* and the streak 33*e* can be identified by whether they extend along the blade 42 movement direction. By detecting the wound 33*f* of the membrane 33, the abnormality determination device 100 can notify the operator that there is a possibility that a product failure may occur although the layering fault does not occur.

In the abnormality determination device 100 in the controller 11, a streak or groove that is not determined to be a linear abnormal portion among the streak 33*e* or grooves occurring in the membrane 33 may be determined as a point-like abnormal portion. The controller 11 may detect and store the position (coordinate position) and magnitude of the point-like abnormal portion in the storage device 12. Accordingly, when the layering fault is found in a subsequent process (for example, an appearance inspection step) and the linear abnormal portion is not detected although the point-like abnormal portion is detected, the threshold value for detecting the linear abnormal portion may be modified. For example, when the controller 11 detects a groove extending in the movement direction of the blade 42 and having a size of 5 cm or more as a linear abnormal portion, the threshold value is changed to 4 cm, for example. Thus, the detection accuracy of the layering fault is improved. Alternatively, the design value of the size or shape of the part to be shaped next time may be changed based on the stored position and size of the point-like abnormal portion. Alternatively, the design value of the size or shape of the support member of the part to be shaped next time may be changed based on the stored position and size of the point-like abnormal portion.

The controller 11 may further store data of an appearance inspection result after formation of the part and data of whether layering fault has occurred. The data of the appearance inspection result is, for example, an image obtained by imaging a part or good/bad data of an inspection. As a result, the controller 11 can collect data that can be verified for layering fault afterwards.

In addition, although the abnormality determination device 100 displays the part 90 displayed on the screen G in FIG. 4 based on the CAD data, an image obtained by imaging the part 90 created in the additive manufacturing apparatus 1 and washed in the washing step may be displayed on the screen G in FIG. 4. The part 90 may be marked and displayed with an internal linear abnormal portion without being scanned after creation.

The abnormality determination device 100 is not limited to the additive manufacturing apparatus 1 described in the embodiments, and can be applied to any additive manufacturing apparatus that stretches raw material using a blade.

What is claimed is:

1. An abnormality determination device for an additive manufacturing apparatus for building a part having three-dimensional shape by repeatedly forming a membrane of raw material and forming a cured layer having two-dimensional shape, the membrane formed by a blade in a build area, the raw material including ceramic particles and photocurable resin, the cured layer formed by irradiating the membrane with light in the build area, the abnormality determination device comprising a controller configured to perform abnormality determination based on an image captured by an image sensor, the controller is configured to:

acquire the image of the membrane captured by the image sensor;

detect an abnormal portion appearing in the membrane based on the acquired image of the membrane;

determine whether the detected abnormal portion is a linear abnormal portion appearing as a line extending along a movement direction of the blade or a point-like abnormal portion appearing at a point;

determine that layering fault has occurred when it is determined that the detected abnormal portion is the linear abnormal portion; and determine that the layering fault has not occurred when it is determined that the detected abnormal portion is the point-like abnormal portion.

2. The abnormality determination device according to claim 1, further comprising a notification device configured to notify an operator, wherein the controller causes the notification device to notify that the layering fault has occurred.

3. The abnormality determination device according to claim 1, further comprising a storage device, wherein the controller is configured to:

store the image captured by the image sensor in the storage device in response to determining that the layering fault has occurred;

detect a position and a size of the linear abnormal portion based on the acquired image of the membrane; and store the detected position and size of the linear abnormal portion in the storage device.

4. The abnormality determination device according to claim 1, wherein the controller is configured to:

detect a position and a size of the linear abnormal portion based on the acquired image of the membrane;

obtain data of the part including data of cross-sectional shape for each layer; and cause a display device to display an appearance of the part on which the linear abnormal portion is marked based on the acquired data and the detected position and size of the linear abnormal portion.

5. The abnormality determination device according to claim 1, further comprising a storage device, wherein the controller is configured to:

detect a point-like abnormal portion appearing at a point occurring in the membrane, and detecting a position and a size of the linear abnormal portion and the point-like abnormal portion based on the acquired image of the membrane; and store the detected position and size of the linear abnormal portion and the point-like abnormal portion in the storage device, wherein the linear abnormal portion and the point-like abnormal portion are classified based on the size and the movement direction.

6. The abnormality determination device according to claim 5, wherein the storage device further stores data of an appearance inspection result after the part is built and data of whether the layering fault occurs.

7. An abnormality determination method applied to an additive manufacturing apparatus for building a part having three-dimensional shape by repeatedly forming a membrane of raw material and forming a cured layer having two-dimensional shape, the membrane formed by a blade in a build area, the raw material including ceramic particles and photocurable resin, the cured layer formed by irradiating the membrane with light in the build area, the method comprising:

acquiring an image of the membrane captured by an image sensor;

detecting an abnormal portion appearing in the membrane based on the acquired image of the membrane;

determining whether the detected abnormal portion is a linear abnormal portion appearing as a line extending along a movement direction of the blade or a point-like abnormal portion appearing at a point; and determining that layering fault has occurred when it is determined that the detected abnormal portion is the linear abnormal portion, and determining that the layering fault has not occurred when it is determined that the detected abnormal portion is the point-like abnormal portion.

* * * * *